United States Patent [19]

Mulder et al.

[11] 4,341,955
[45] Jul. 27, 1982

[54] IMAGE INTENSIFIER OF THE PROXIMITY-FOCUS TYPE

[75] Inventors: Hendrik Mulder; Johannes J. Houtkamp, both of Delft, Netherlands

[73] Assignee: N.V. Optische Industrie "De Oude Delft", Netherlands

[21] Appl. No.: 116,973

[22] Filed: Jan. 30, 1980

[30] Foreign Application Priority Data

Feb. 2, 1979 [NL] Netherlands .................. 7900878

[51] Int. Cl.³ ............................................. H01J 31/50
[52] U.S. Cl. ................................. 250/213 VT; 313/94
[58] Field of Search ............ 250/213 R, 213 VT, 239, 250/445 T, 332, 333; 313/94–98, 102

[56] References Cited

U.S. PATENT DOCUMENTS

| 3,553,518 | 1/1971 | Schagen | 313/94 |
| 4,024,390 | 5/1977 | Bosserman et al. | 250/213 VT |
| 4,047,041 | 9/1977 | Houston | 250/445 T |
| 4,075,492 | 2/1978 | Boyd et al. | 250/445 T |
| 4,239,960 | 12/1980 | Galluppi | 250/213 VT |

Primary Examiner—David C. Nelms
Attorney, Agent, or Firm—Louis E. Marn; Elliot M. Olstein

[57] ABSTRACT

An image intensifier of the proximity-focus type, comprising at least one photocathode and at least one anode screen located opposite to the photocathode, said photocathode and said anode screen being disposed in a hollow body in which a vacuum prevails, while, in use, there is an electrical field between cathode and anode. According to the invention the photocathode surface and the anode screen surface extend substantially parallel to the axis of the hollow body.

18 Claims, 8 Drawing Figures

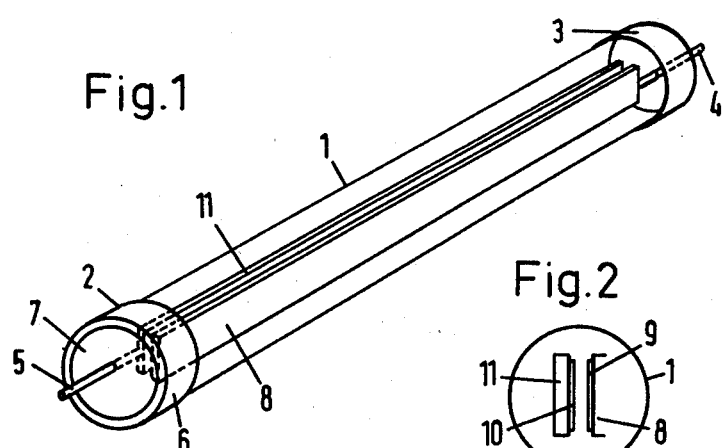
Fig.1
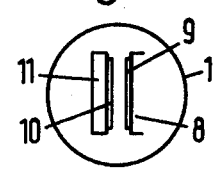
Fig.2
Fig.3
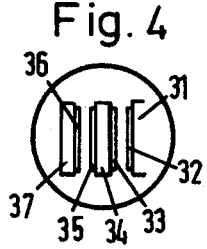
Fig.4
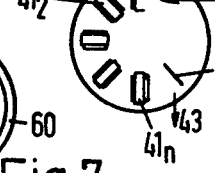
Fig.5
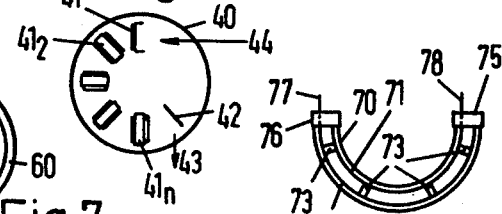
Fig.7  Fig.8
Fig.6
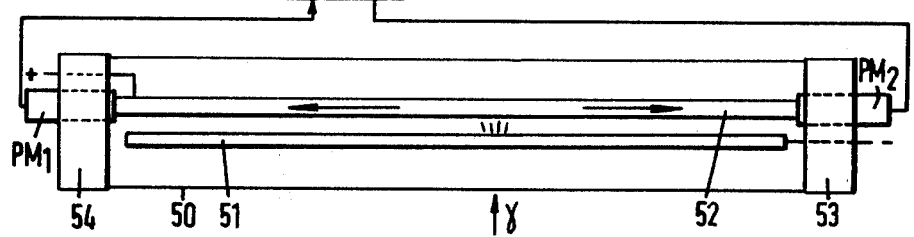

IMAGE INTENSIFIER OF THE PROXIMITY-FOCUS TYPE

This invention relates to an image intensifier of the proximity-focus type comprising at least one photocathode and at least one anode screen located opposite the photocathode, said photocathode and said anode screen being disposed in a hollow body in which a vacuum prevails, while in operation there is an electric field between the cathode and the anode. Known devices of the proximity-focus type comprise a cylindrical glass body provided on one end with a cathode window with a cathode, for example sensitive to light, being arranged on the inside of said cathode window or on a loose support, and provided at the other end with an anode window with an anode which under the influence of electrons liberated from the cathode by the incident light, and subsequently accelerated by an electric field present between cathode and anode, forms an intensified light image at the output end. In the glass body there is a vacuum, and the distance between cathode and anode is so small that no additional focussing electrodes are needed. In this known device, therefore, the axis of the cylindrical body is substantially parallel to the electric field present between cathode and anode.

A disadvantage of this known device is that the anode and the cathode are normally round, which in uses concomitant with non-round images results in less than optimum utilization of cathode and anode surfaces. Furthermore, the length to be sealed, which in the prior device is approximately equal to the circumference of the cathode window increased by the circumference of the anode window, is relatively long, which makes the risk of leakage also relatively large. Finally, the diameter cannot be increased at will, as this would result in the end windows being unduly loaded.

It is an object of the invention to remedy the disadvantages outlined. To this effect, according to the invention, an image intensifier of the proximity-focus type is characterized in that the cathode surface and the anode surface extend substantially parallel to the axis of the hollow body.

The invention will be described in more detail hereinafter with reference to the accompanying drawings of some exemplary embodiments.

FIG. 1 is a diagrammatic perspective view of one embodiment of a device according to the invention;

FIG. 2 is a diagrammatic cross-sectional view of the device of FIG. 1;

FIG. 3 is a diagrammatic planview of the device shown in FIGS. 1 and 2;

FIG. 4 is a diagrammatic cross-sectional view of a two-stage device according to the invention;

FIG. 5 is a diagrammatic cross-sectional view of an n-stage device according to the invention;

FIG. 6 is a diagrammatic view of a special embodiment of an apparatus according to the invention, particularly suitable for use as a detector of γ-radiation; and FIG. 7 is a diagrammatic cross-sectional view of still another embodiment of a device according to the invention; and FIG. 8 shows in planview still another embodiment of a device according to the invention.

FIGS. 1, 2 and 3 show diagrammatically a first embodiment of a device according to the invention. The embodiment shown comprises a tubular body 1, which is made of glass and sealed vacuum-tight at the end. To this effect, tube bases 2 and 3 of a suitable material are mounted at the ends, which bases are provided with passages for terminals 4 and 5 and with at least one suction tube not shown for evacuating the tube and forming the photocathode. The tubular body consists preferably of glass, but this is not essential, so long as the material used transmits the radiation to be detected and the image formed at the anode end. Thus, for example, the tubular body may be made of metal, with a window transmitting the radiation to be observed being provided at the desired positions.

Bases 2 and 3 can be constructed and secured to the tube body in various manners. Thus, for example, the tube body may be fused at its ends around the terminal provided at the respective end, and the base may be cemented to the sealed end. All this in the manner in which this is effected, for example, with electric bulbs or image intensifier tubes. In this way the base only serves as a protective member and not as a sealing member. The base itself can then be made of metal and also serve as a terminal. It is also possible for the base to be made entirely of insulating material with the terminal being passed to the outside through the insulating base. In the embodiment shown, the base consists of a metal sleeve 6 fitting the end of the tube body and sealed with a plate 7 of insulating material having a passage for the terminal.

In case the tube body is not fused at its ends, the bases may be constructed substantially in the same ways as described above, but more attention must be paid to sealing, because in this case the bases themselves form the sealing means for the tube body.

Furthermore, there will be described, hereinafter, embodiments of the device according to the invention, in which a plurality of terminals are passed to the outside through one and the same base. In that case, the base is provided with a corresponding plurality of passages, insulated relatively to each other. Several other variations of the base are possible.

The bases can also be formed by brass tubes arranged at the ends of the hollow body and being co-extensive therewith, and at least one of which is used for evacuating the hollow body, and which after the evacuation and the formation of the photocathode are pinched off to provide a vacuum-tight seal.

Extending in substantially parallel, slightly spaced relationship within the tubular body are a strip-shaped cathode and a strip-shaped anode. The cathode is mounted on a carrier permitting the passage of the radiation to be detected. If the apparatus is designed for use as a light image intensifier, carrier 8 may for example be made of glass. For use with different kinds of radiation, such as X-rays, the carrier may be made, for example, of aluminum.

Disposed on the side of carrier 8 facing the anode is a photocathode 9. The composition of the cathode depends on the desired use. Cathode materials suitable for specific uses are known per se and will not, therefore, be further described here. In the embodiment shown, the right-hand end of the cathode is electrically connected to terminal 4.

Disposed in relatively slightly-spaced juxtaposition to cathode 9 is an anode 10, supported on a carrier 11. The anode consists of a known per se and conventional material which emits light under the influence of the electrons from the cathode. Carrier 11 should transmit this light and, for that purpose, may be made for example of glass.

In the embodiment shown, the anode is at its left end electrically connected to terminal 5, which is passed to the outside. This construction has the average that the terminals for anode and cathode, between which there may be a voltage differential of several kilovolts to several tens of kilovolts, may be at a large distance from each other.

In order to effect that the anode and the cathode may remain in proper position relative to each other, two or more spacers 12 may be used. These spacers should consist of electrically insulating material, for example, glass or ceramic material.

Furthermore, it is possible, optionally in combination with the spacers, for the ends of carriers 8,11 away from the terminals to be provided with extension pieces not shown, which are anchored in the adjacent tube base in an insulated manner, in order to produce a construction that is mechanically, and hence electrically, more reliable.

A device as described above is particularly suitable for use in forming a tomogram. For in that technique, a body is irradiated with a very flat X-ray beam to form a strip-shaped X-ray shadow image, a so-called profile. From a number of profiles, each pertaining to a given position of the body relative to the X-ray beam, the desired tomogram can be formed in known manner. Owing to its form, the image intensifier described is highly suitable for converting such profiles into light images of high light intensity, which can be processed further.

FIG. 4 shows diagrammatically a two-stage form of a device according to the invention. The device comprises a tubular body 30 containing a strip-shaped cathode carrier 31 carrying a cathode 32. Opposing cathode 32 is an anode 33, supported on a light-permeable carrier 34. Formed on the side of carrier 34 away from cathode 32 is a second light-sensitive cathode 35. Opposing the second cathode 35 is a second anode 36 on a light-transmitting carrier 37.

The structural design and selection of materials of the two-stage embodiment may otherwise be similar to those of the one-stage form. The same applies to the n-stage embodiment of a device according to this invention, illustrated in FIG. 5. In the n-stage embodiment of FIG. 5, there are provided within a tubular body 40 a cathode carrier provided with a first cathode 41 and a plurality of anode-cathode carriers $41_2$ to $41_n$, provided with associated anodes and cathodes built up in similar manner to carrier 34 with anode 33 and cathode 35 of FIG. 4. Each cathode has an anode disposed in opposition to it.

In a multi-stage device, it may be advantageous for the cathodes and anodes to be placed not in the configuration shown in FIG. 4, but in a fan-shaped configuration as illustrated in FIG. 5. In this manner a high factor of image intensification can be obtained, and the place of the output image can be adapted to the apparatus in which the detector is to be used. It is true that as a result of the fan-shaped configuration there is a certain elongation of the image in one direction but in many cases, in particular in tomography, this is immaterial.

In the device of FIG. 5, there is further provided a mirror 42 which serves to enable observation of the image of the last anode in a suitable manner in the direction indicated by an arrow 43. An arrow 44 indicates the direction of the radiation falling on the first cathode. The mirror is shown by way of example only. Not in all cases is a mirror required; this depends, for one thing, on the factual configuration of cathodes and anodes and for another on the apparatus for which the device is designed. Also, it is not necessary for the mirror to be arranged within the tubular body, or a curved mirror may be used which in certain cases could be produced by applying a reflective strip to the inner surface of the tube wall. When an interior mirror is used, as shown, this may be secured to the ends in a similar manner to the cathodes and anodes. Naturally, such a mirror can also be used in a one-stage device.

FIG. 6 shows a special embodiment of a device according to the invention, which is particularly suited for the detection of γ-rays. Provided, in the manner described, within a tubular body 50 permeable to 65 -radiation, is a strip-shaped cathode 51 and a strip-shaped anode 52. From the cathode material, the γ-rays, indicated by an arrow, liberate electrons, which are accelerated by the electric field provided between cathode and anode, and fall on the anode opposite the position of incidence of the γ-rays on the cathode. It is often of interest to know where the γ-rays fall on the cathode. This can be detected with the device of FIG. 6 by the use of an anode carrier which is light-conductive in its longitudinal direction and at its ends is coupled to photomultiplier tubes PM1 and PM2, secured in the respective tube bases 53 and 54. A comparison of the electrical output signals from the photomultiplier tubes can determine the position of incidence of the electrons liberated by the γ-radiation on the anode, and hence also the position of incidence of the γ-rays on the cathode. For this purpose the output lines of the photomultiplier tubes are connected to a known per se comparator C, which provides the desired output information.

FIG. 7 shows an extremely simple embodiment of a device according to the invention, in which a cathode 60 and an anode 61 are applied directly to the inside of the tubular body 62. The cathode and the anode are again connected to the ends of the tubular body by means of terminals passed to the outside.

The embodiment shown in FIG. 7 is only suitable for use in cases in which distortion of the image in the vertical direction (as viewed in the drawing) is not objectionable. This is the case, for example, in processing profiles for forming a tomogram.

FIG. 8, finally, shows a device according to the invention which, as a whole, is curved. Disposed within a curved, vacuum-tight tubular body 70 are a cathode 71, on an associated carrier and an anode 72 on an associated carrier. The two carriers can be kept at a uniform distance from each other by means of insulating spacer members 73. In the embodiment shown, the tubular body is provided, in similar manner to the embodiments described hereinbefore, with tube bases 75,76, through which terminals 77,78 for anode and cathode, respectively, are passed to the outside. Such a curved embodiment can also be constructed as a multistage device, and offer certain advantages for special uses, for example, in tomographic apparatus.

It is noted that various modifications can be readily made by those skilled in the art without departing from the scope of the present invention.

We claim:

1. An image intensifier of the proximity-focus type, comprising at least one photocathode surface and at least one anode screen surface located opposite to said photocathode surface, said photocathode surface and said anode screen surface being disposed in a hollow body having a longitudinal axis in which a vacuum prevails and wherein during use, there is provided an electrical field between said photocathode surface and said anode screen surface, characterized in that said photocathode surface and said anode screen surface extend substantially parallel to said longitudinal axis of said hollow body and are spaced apart a distance insufficient to require focussing electrodes.

2. The image intensifier according to claim 1, characterized in that said photocathode surface and said anode screen surface are strip-shaped.

3. The image intensifier according to claim 1, characterized in that said hollow body is in the form of an elongated tube and of a material permeable to radiation to be detected or image to be observed at a level of said photocathode surface and said anode screen surface, respectively.

4. The image intensifier according to claim 3, characterized in that said elongated tube is sealed by means of tube bases mounted in vacuum-tight relationship on ends of said elongated tube.

5. The image intensifier according to claim 3, characterized in that said elongated tube is made of glass and said ends are fused.

6. The image intensifier according to claim 5, characterized in that said ends of said elongated tube are fused around terminals for said photocathode surface and said anode screen surface passing outside of said ends.

7. The image intensifier according to claim 6, characterized by tube bases mounted at said ends of said elongated tube.

8. The image intensifier according to claims 4 or 7 characterized in that said tube bases are provided with insulated passage openings for said terminals for said photocathode surface and said anode screen surface.

9. The image intensifier according to claims 6 or 7 characterized in that said terminals for said photocathode surface and said anode screen surface are disposed at different ends of said hollow body.

10. The image intensifier according to claims 1,2,5,6 or 7 characterized in that said photocathode surface and said anode screen surface are supported on carriers provided within said hollow body, said carriers maintained in substantially uniformly spaced relationship from each other by means of a plurality of spacer members.

11. The image intensifier according to claim 1 characterized by at least one additional photocathode surface and one additional anode screen surface provided on opposite sides on a single carrier.

12. The image intensifier according to claim 11, characterized in that all photocathode surfaces and all anode screen surfaces are parallel.

13. The image intensifier according to claim 11, characterized in the said photocathode surfaces and said anode screen surfaces are disposed in an alternating fan-shaped configuration.

14. The image intensifier according to claims 1,2,5,6,7,12 or 13 characterized by a strip-shaped mirror provided within said hollow body to reflect an image from the last anode screen surface to an outside detector.

15. The image intensifier according to claim 14, characterized in that said mirror is formed by a reflective wall portion of said hollow body.

16. The image intensifier according to claims 1 or 8 characterized in that said photocathode surface and said anode screen surface are provided on an inner wall portion of said hollow body.

17. The image intensifier according to claim 16 characterized in that said hollow body, said photocathode surface and said anode screen surface are of a curved configuration.

18. The image intensifier according to claims 1,3,5,6,7,12,13,15 or 17 and particularly suitable for γ-ray radiation, characterized by an anode carrier capable of conducting light in its longitudinal direction, and coupled at each end thereof with a light detector, output signals from the light detectors being passed to a comparator producing an output signal corresponding to a position of incidence radiation of said γ-ray radiation on said photocathode surface.

* * * * *

UNITED STATES PATENT AND TRADEMARK OFFICE
CERTIFICATE OF CORRECTION

PATENT NO. : 4,341,955

DATED : JULY 27, 1982

INVENTOR(S) : HENDRIK MULDER and JOHANNES J. HOUTKAMP

It is certified that error appears in the above-identified patent and that said Letters Patent is hereby corrected as shown below:

Col. 4, line 14, "65" should be -- $\gamma$ --

Signed and Sealed this

Twenty-fourth Day of January 1984

[SEAL]

Attest:

GERALD J. MOSSINGHOFF

Attesting Officer   Commissioner of Patents and Trademarks